United States Patent

Neumann et al.

[11] 3,782,791
[45] Jan. 1, 1974

[54] VORTEX DIFFUSER FLUID BEARING DEVICE

[75] Inventors: John W. Neumann, Birmingham, Mich.; Harry A. Mackie, Raleigh, N.C.

[73] Assignee: The Udylite Corporation

[22] Filed: Mar. 17, 1971

[21] Appl. No.: 125,251

[52] U.S. Cl. .............................. 308/9, 308/DIG. 1
[51] Int. Cl. ........................................ F16c 17/00
[58] Field of Search ...................... 308/DIG. 1, 9

[56] References Cited
UNITED STATES PATENTS

| | | | |
|---|---|---|---|
| 3,140,853 | 7/1964 | Lindner | 308/9 |
| 3,265,452 | 5/1965 | Pan | 308/DIG. 1 |
| 2,683,635 | 7/1954 | Wilcox | 308/9 |
| 3,308,848 | 4/1967 | Johnson et al. | 308/9 |
| 3,603,664 | 9/1971 | James | 308/9 |
| 3,154,353 | 10/1964 | Haring et al. | 308/9 |
| 2,756,114 | 7/1956 | Brunzel | 308/9 |
| 2,513,481 | 8/1950 | Heginbarth | 308/9 |

OTHER PUBLICATIONS
Product Engineering, 12/7/64 "New Data on Gas Bearings."

Primary Examiner—Charles J. Myhre
Assistant Examiner—R. H. Lazarus
Attorney—Harness, Dickey & Pierce

[57] ABSTRACT

A fluid bearing load supporting system having unidirectional and omnidirectional capabilities which embodies means for forming one or a plurality of fluid vortices for separating a body from a supporting surface by an intervening cushion of fluid, providing therewith an extremely low coefficient of friction that facilitates a conveyance of the body for the purposes of transportation, processing, treatment and the like.

16 Claims, 33 Drawing Figures

PATENTED JAN 1 1974 3,782,791

INVENTORS.
John W. Neumann
Harry A. Mackie
BY
Harness, Dickey & Pierce
ATTORNEYS.

INVENTORS.
John W. Neumann
Harry A. Mackie
BY
Harness, Dickey & Pierce
ATTORNEYS.

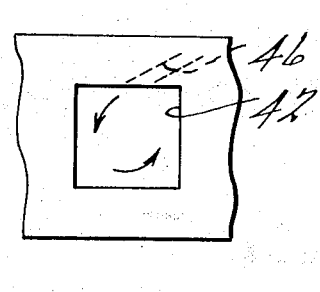
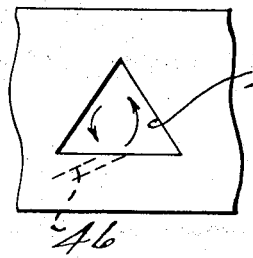
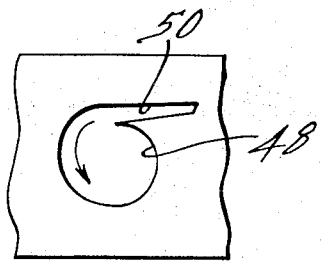
FIG.9.   FIG.10.   FIG.11.
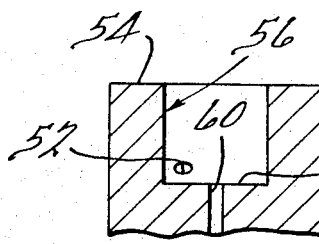
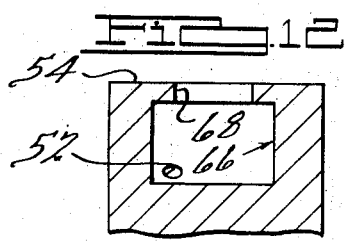 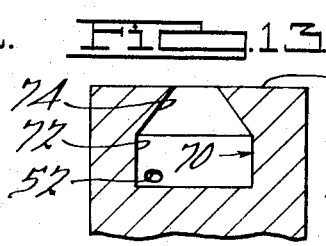 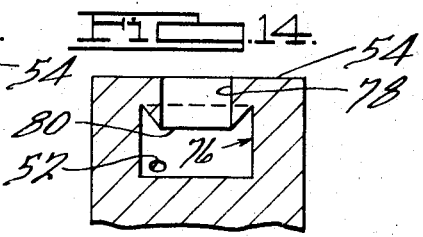
FIG.12.   FIG.13.   FIG.14.
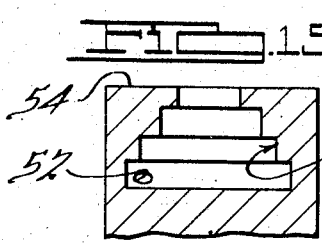 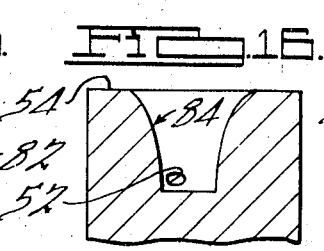 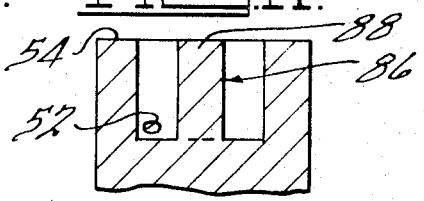
FIG.15.   FIG.16.   FIG.17.
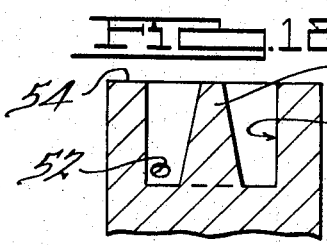 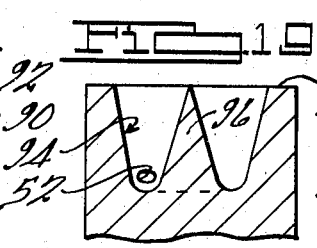 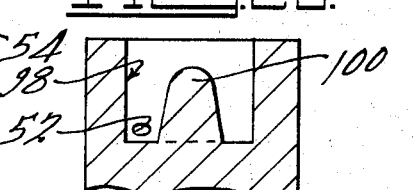
FIG.18.   FIG.19.   FIG.20.
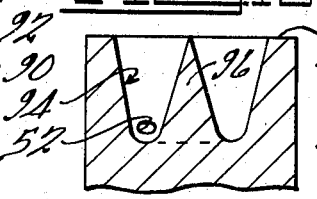 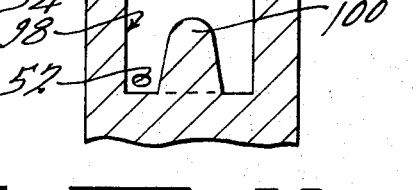
FIG.21.   FIG.22.   FIG.23.
INVENTORS
John W. Neumann
Harry A. Mackie
BY
ATTORNEYS.

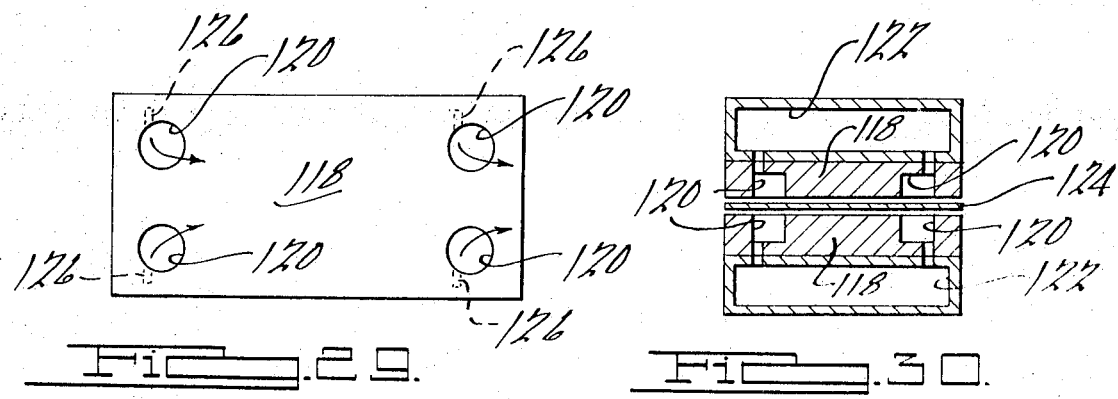
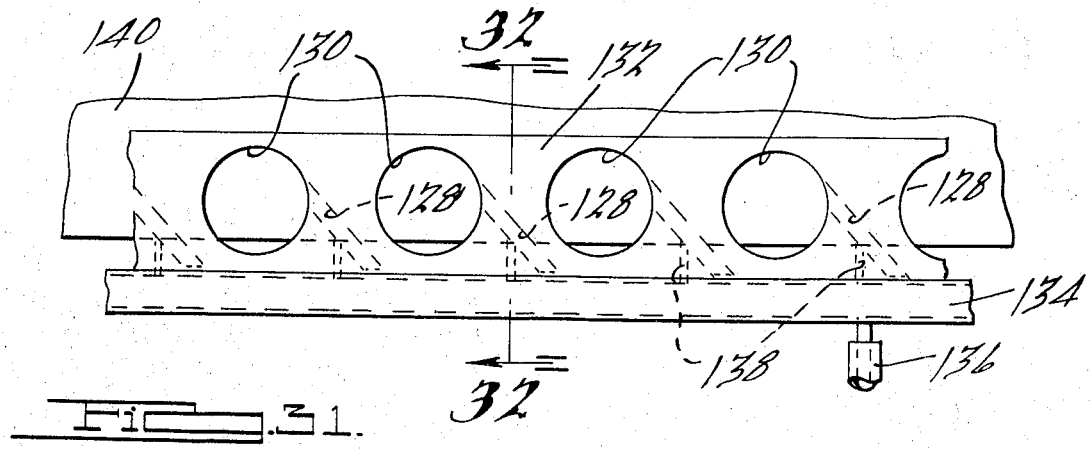
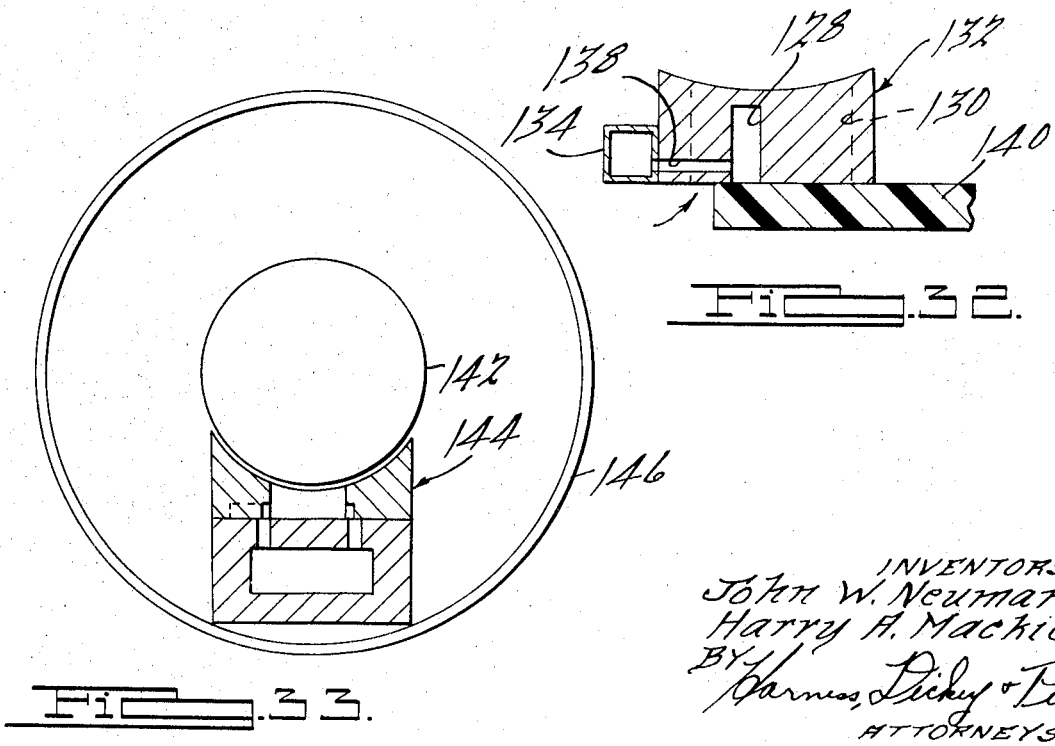

VORTEX DIFFUSER FLUID BEARING DEVICE

BACKGROUND OF THE INVENTION

A variety of techniques and systems have heretofore been used or suggested for use for supporting loads on a cushion of air which facilitates movement of the load due to the extremely low frictional characteristics of such air cushions. A basic form of such prior art air bearing devices comprises a substantially flat load supporting bearing plane which is disposed in close parallel spaced clearance relationship relative to the ground or other supporting surface, defining therebetween a clearance gap through which air is pumped and exerts the vertical force necessary to support the load. A disadvantage of the foregoing air bearing device is that the clearance gap must be kept relatively small in order to keep the air flow requirements within reasonable limits and the supporting surface over which the device operates must be relatively flat and true to provide satisfactory performance.

In order to enable satisfactory operation over terrain other than specially prepared ground surfaces, alternate ground effect devices have been developed, included among which is the peripheral jet device and the air caster device. In the peripheral jet device, a peripheral curtain of air is injected downwardly and inwardly from an annular nozzle located on the underside of a substantially flat body which exerts a lifting force as a result of the combined force of the jet striking the ground surface and the pressurized bubble of air entrapped within the periphery of the curtainous jet. The air caster, on the other hand, employs a flexible diaphragm which is filled with air and is provided with appropriate ports through which air flows and escapes around the periphery of the diaphragm, forming a clearance gap on which the body is supported in a manner somewhat similar to that of the basic air bearing device.

Various modifications of the foregoing three types of ground effect vehicles have been suggested but, at least to this date, have not received widespread commercial acceptance because of one or more deficiencies in their adaptation to a specific end use. Such prior art type ground effect devices are further restricted to an operation in which the air flow is employed to lift a load vertically relative to a supporting ground surface or, alternatively, by a reversal in the direction of flow to effect a lifting of a load in response to movement toward an overhead supporting surface as the case may be. Such prior art air bearing devices have heretofore been installed directly on vehicles or movable members to facilitate movement thereof over a ground supporting surface requiring the provision of an appropriate air pumping system on each such vehicle or member so equipped.

The vortex diffuser fluid bearing device comprising the present invention provides a unique approach to supporting bodies on a cushion of air or other fluid substance, whereby opposing forces are concurrently imposed on a body which are maintained in appropriate dynamic equilibrium such that the body is retained in a spaced clearance relationship relative to an adjacent surface. The means for forming one or a plurality of fluid vortices can readily be incorporated in a stationary frame or rail for movably supporting the article or vehicle for unidirectional or omnidirectional movement relative thereto.

SUMMARY OF THE INVENTION

The benefits and advantages of the present invention are achieved by an air or fluid bearing device comprising a member formed with at least one cavity therein having an opening at a surface of said member, from which a pressurized fluid is discharged in the form of a vortex which is adapted to coact with a body disposed in spaced relationship relative to said surface in a manner to concurrently apply attracting and repelling forces thereto that are in dynamic equilibrium, whereby the body is maintained in appropriate spaced relationship on a substantially frictionless cushion of fluid. The vortex diffuser fluid bearing device, in view of its unique ability to impose push-pull forces on objects disposed adjacent thereto, can readily be employed in a large variety of uses, of which the support and conveyance of objects on a cushion of air constitutes a particularly satisfactory adaptation.

In one of the embodiments of the present invention, a plurality of cavities are formed in the member, each of which is disposed in communication with a suitable source of a pressurized gas and wherein one or a plurality of inlet jets are incorporated in each cavity which, by variation in location, size and number, impose a controlled unidirectional or omnidirectional force on objects supported thereby. The embodiment in which the member is in the form of an elongated rail provides means for simple transport of loads including vehicles, as well as for conveyance of workpieces, through one or a plurality of sequentially-phased processing steps. While for most purposes air is employed as the fluid for forming the vortices and supporting fluid cushion, it is also contemplated that alternative gaseous and liquid substances can be employed for providing a selected treatment including combustible gases which can be ignited upon discharge from one or a plurality of vortex cavities to effect a heating of the objects supported thereby.

Additional benefits and advantages of the present invention will become apparent upon a reading of the description of the preferred embodiments, taken in conjunction with the accompanying drawings.

BRIEF DESCRIPTION OF THE DRAWINGS

FIGS. 9 through 11 are fragmentary plan views of alternative satisfactory transverse cross sectional configurations of vortex diffusers;

FIGS. 12 through 23 are fragmentary transverse sectional views through members illustrating alternative satisfactory longitudinal configurations of vortex diffusers of this invention;

Figure 28:
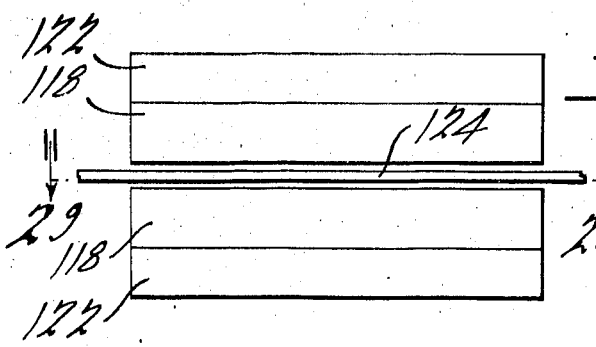
FIG. 28 is a side elevational view of a linear motor in accordance with an alternative satisfactory embodiment of the present invention.

FIG, 29 is a horizontal transverse sectional view of the device shown in FIG. 28 as taken substantially along the line 29—29 thereof;

FIG. 30 is a transverse vertical sectional view of the device shown in FIG. 28 and taken substantially along the line 30—30 thereof.

Figure 2:
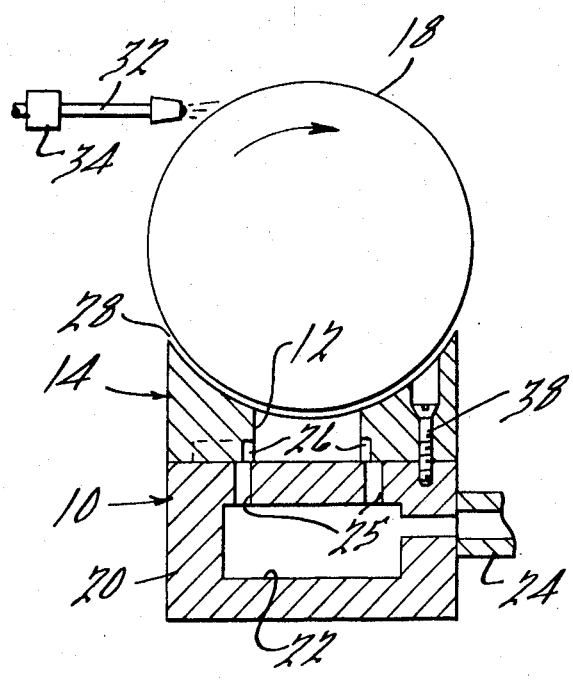
FIG. 2 is a transverse vertical sectional view through the air rail shown in FIG. 1, and taken substantially along the line 2—2 thereof.
Figure 3:
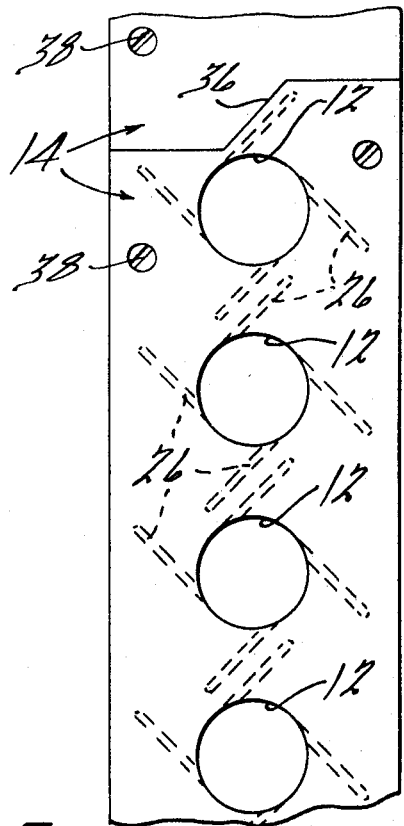
FIG. 3 is a fragmentary plan view of the air rail section shown in FIG. 1.

FIG. 31 is a fragmentary plan view of an air rail section provided with an aspirator for introducing air into the vortex diffuser cavities thereof;

FIG. 32 is a transverse vertical section view through the air rail shown in FIG. 3 and taken substantially along the line 32—32 thereof;

FIG. 33 is a transverse vertical sectional view of an air rail similar to that shown in FIG. 2 and incorporating a helical induction element for heating the cylindrical articles conveyed therealong.

DESCRIPTION OF THE PREFERRED EMBODIMENTS

Figure 1:
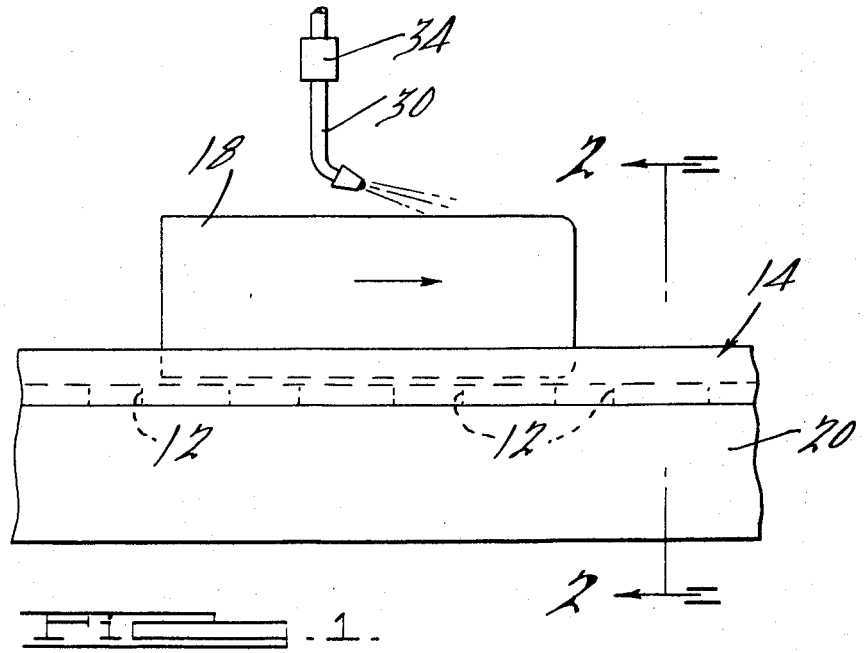
FIG. 1 is a fragmentary side elevational view of an air rail on which a circular cylindrical article is movably supported in accordance with one of the embodiments of the present invention.

Referring now in detail to the drawings, and as may be best seen in FIGS. 1 and 2, the vortex diffuser air bearing device is shown in the form of an air rail 10 having a plurality of vortex diffusers or cavities 12 disposed at longitudinally spaced increments therealong. The air rail assembly 10 comprises an air rail section 14 which, in the exemplary embodiment shown, is formed with an arcuate concave supporting surface 16 of a configuration corresponding substantially to the peripheral contour of an object, such as a workpiece container 18, movably supported thereon. A manifold section 20 is securely affixed to the underside of the air rail assembly 10 defining a supply chamber 22 from which a pressurized gaseous substance is supplied to each of the vortex diffusers 12. The interior of the supply chamber 22 may suitably be connected to a source of pressurized gas by means of a supply conduit 24 as illustrated in FIG. 2.

Figure 4:
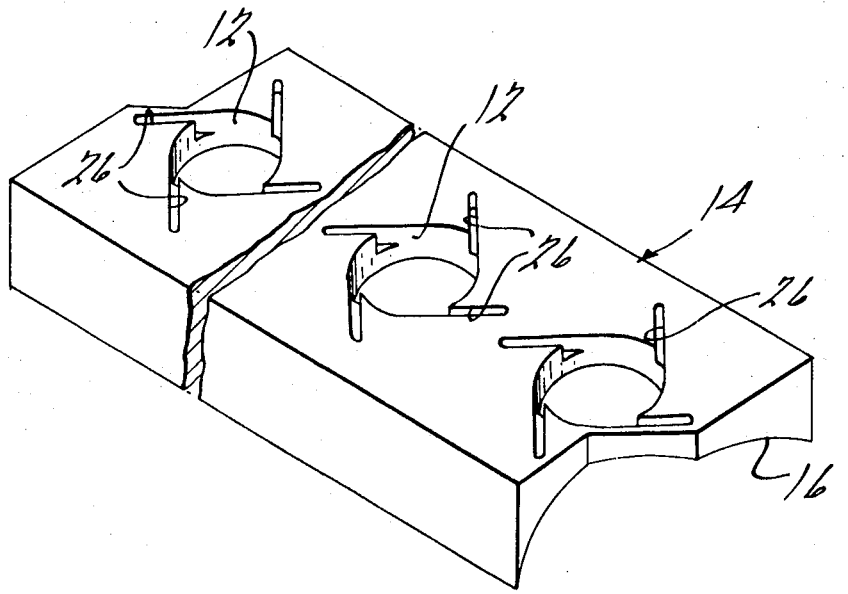
FIG. 4 is a perspective view showing a fragmentary section of the underside surface of the air rail and with the ends appropriately chamfered for interfittingly connecting such sections together, forming a substantially continuous rail.

As best seen in FIGS. 2–4, each of the vortex diffusers or cavities 12 is disposed in communication with the supply chamber 22 by means of four vertical ports or orifices 25, each of which communicates with one of four tangentially oriented jets 26, whereby the pressurized gas enters adjacent to the base of the vortex diffuser and moves in a helical manner outwardly toward the open end thereof, at which it comes in contact with the surface of an article disposed in clearance relationship relative to the arcuate concave surface 16. The orifices 25 are of a size in relation to the pressure and volume of air in the supply chamber 22 such that the flow of air into each vortex diffuser is substantially independent and unaffected by variations in flow rates of adjacent vortex diffusers. In the exemplary embodiment illustrated the discharge of the gas in the form of a vortex from each of the vortex diffusers forms an air cushion between the periphery of the object and the arcuate concave surface 16, which is defined by a clearance gap 28 as shown in FIG. 2.

The provision of four jets 26 disposed at substantially equal circumferential increments provides for the formation of a substantially uniform vortex of gas which does not have a residual linear component that tends to cause unilateral movement of the container 18 along the air rail assembly. Accordingly, the container may remain at rest along selected stations and can be selectively propelled by means of the provision of an auxiliary jet 30, as shown in FIG. 1, which is oriented so as to impinge upon the workpiece container 18, tending to propel it toward the right as viewed in FIG. 1. The auxiliary jet 30 may suitably be connected to the same source of pressurized gas or air employed in supplying the manifold of the air rail assembly and may operate continuously or may be pulsed intermittently as may be desired to achieve the appropriate conveyance of the container or article.

In a similar manner, rotation of the workpiece container 18 can be achieved by a second auxiliary jet 32, as shown in FIG. 2, which is oriented laterally of the path of travel of the container 18 and is adapted to continuously or intermittently discharge a gaseous stream for imparting rotation to the container in a generally clockwise direction, as viewed in FIG. 2. As will be noted in FIGS. 1 and 2, the supply lines connected to auxiliary jets 30 and 32 may suitably be provided with flow control valves 34 for regulating the quantity of gas discharged therefrom to provide the desired acceleration, deceleration velocity and/or rotation of the container, as may be desired.

Figure 5:
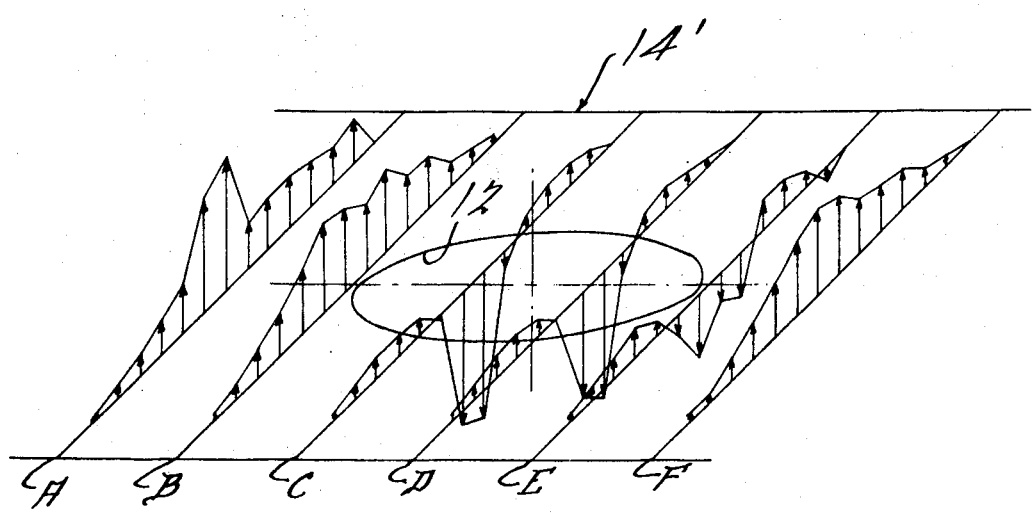
FIG. 5 is a diagrammatic perspective view illustrating the variations in pressure acting upon a cylindrical object as measured along longitudinally spaced transverse sections of an air rail adjacent to a vortex diffuser.
Figure 6:
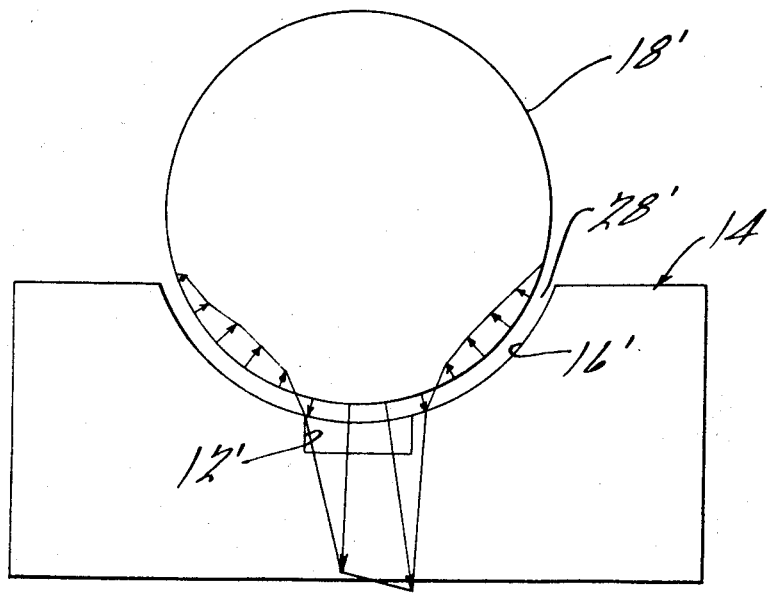
FIG. 6 is a schematic transverse sectional view of the differential pressures acting upon a cylindrical object supported in the air rail adjacent to a vortex diffuser taken along one of the transverse sections as shown in FIG. 5.
Figure 7:
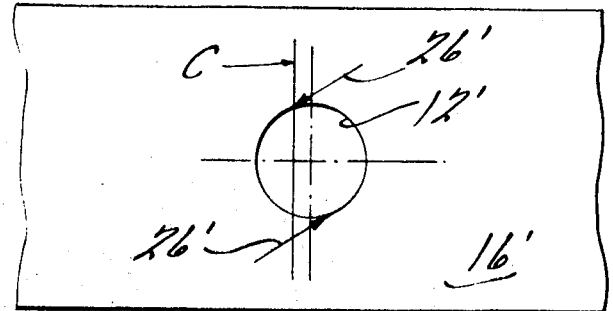
FIG. 7 is a schematic plan view illustrating the arrangement of jets and the transverse line along which the pressure differentials illustrated in FIG. 6 were taken.

The novel combination of forces applied to articles supported adjacent to the air rail is illustrated in the schematic drawings comprising FIGS. 5–7. The particular pressure pattern will vary depending on the configuration of the air rail surface 16, the pressure and velocity of the gas forming the vortex in each of the cavities 12, the configuration and conformation of the peripheral surface of an object relative to the surface of the air rail section, the density of the gaseous substance, the weight of the object, the spacing or distance of the clearance gap defining the cushion of gas, the velocity of travel of the object along the air rail, the longitudinal spacing of adjacent vortex diffusers, the number and position or orientation of jets disposed in communication with each of the vortex diffusers for supplying the pressurized gas thereto, the specific contour or configuration of the wall defining the cavity comprising the vortex diffuser including the shape of the corner at which the cavity meets the air rail supporting surface, and the general smoothness of the adjacent surfaces in contact with the flowing gas. The specific pressure pattern illustrated in FIG. 5 is that derived from readings taken at longitudinally spaced increments of about ¼ of an inch and at radial increments around the container indicated at 18' in FIG. 6 of about ¼ inch, and wherein the air rail section 14' is formed with an arcuate concave surface 16' which overlies approximately 38 percent of the peripheral circular cylindrical surface of the container. The vortex diffuser 12' itself is formed with two jets diagrammatically indicated at 26', which permit air at room temperature and at a pressure of 1 psig to enter in accordance with the direction of the arrows, forming a vortex rotating in a substantially counterclockwise direction as viewed in FIG. 7. The container 18' is typical of those employed for packaging beverages and comprises a thin-walled circular cylindrical workpiece having one closed end and having a diameter of about 2½ inches and a length of about 4⅞ inches.

FIG. 5 illustrates the pressure differential pattern obtained at fourteen points along each of six transverse planes A–F, with the profile disposed above the lines A–F denoting a superatmospheric pressure, while those portions below denote a subatmospheric pressure reading. Each traverse of pressure readings along transverse lines A–F were made in a manner as typified by traverse C shown in FIG. 6. In the arrangement illustrated schematically in FIG. 6, the periphery of the can 18' corresponds to a pressure reading equivalent to atmospheric pressure such that the profile extending inwardly of the can denotes a positive pressure, while that projecting downwardly and exteriorly of the can periphery denotes a subatmospheric pressure. As noted in FIG. 6, the flow of air outwardly through the clearance gap 28' to each side of the vortex diffuser 12' exerts a positive pressure on the container 18', which tends to lift the can 18' upwardly and away from the arcuate surface 16'. On the other hand, a subatmospheric pressure is exerted on the container in the region corresponding to the vortex diffuser 12', which draws the container downwardly toward the arcuate surface 16'.

Variations of the foregoing pressure pattern are obtained along the traverses A, B and D–F, as shown in FIG. 5, whereby the net push and pull forces acting on the container are in dynamic equilibrium or balance such that the container remains in appropriate spaced relationship from the surface of the air rail as supported by the cushion of air. As will be noted in FIG. 5, the pressure patterns along traverse lines A, B and F denote the existence of superatmospheric pressures along the entire traverse, whereas subatmospheric pressures are encountered at the center portions of the traverse along lines C, D and E. In view of the push-pull forces applied to the container, it will be appreciated that the vortex diffuser fluid bearing device comprising the present invention can be disposed in positions other than immediately beneath a container or article to be supported but may also be disposed above such objects under conditions in which the attractive force is sufficient to overcome the gravitational pull on the objects.

In accordance with the foregoing operation characteristics of the air rail assembly, it will be appreciated that a variety of alternative satisfactory constructions can be employed consistent with the intended end use of the air rail system and the nature of the objects or articles to be conveyed therealong. In the specific embodiment shown in FIGS. 1–4, each air rail section 14 may conveniently be cast or extruded of metal, plastic or other suitable material in the form of individual sections having Z-shaped end sections indicated at 36 in FIG. 3, which serve to assure accurate alignment of adjacent sections. The individual air rail sections 14 can be securely fastened to the upper surface of the manifold section 20 by means of a series of screws 38 having the head portions thereof disposed in countersunk relationship relative to the arcuate concave surface 16.

Alternative satisfactory variations of the embodiment as illustrated in FIGS. 1–4 can be made such as, for example, by providing the air rail section with a flat, convex or contoured surface in lieu of the concave surface 16 in order to accommodate an appropriately contoured object to be movably supported thereon. It will be further appreciated that while the air rail assembly as described is intended primarily to be stationary with the container or other objects movable relative thereto, it is also contemplated that the air rail assembly itself may be affixed to a movable member which in turn is transportable on a cushion of air relative to an appropriately contoured or flat supporting or ground surface.

As previously indicated, when the device is employed solely for the purposes of conveyance and/or transportation of articles, the fluid substance discharged conventionally comprises air. It will be understood, however, that alternative fluids can be used including liquids and fluid mixtures such as aerosols comprising a carrier gas incorporating minute droplets of liquid therein, as well as gases incorporating solid particles suspended therein, in addition to combinations of the foregoing. The use of such alternative fluid substances is desirable when the vortex diffuser fluid bearing device is employed for effecting a simultaneous conveyance and processing of workpieces supported thereby. Such selected treatments can be achieved in a prescribed sequentially-phased manner by changing the type of fluid substance discharged from selected sections of the air rail assembly such that each workpiece is subjected to a prescribed treatment during its travel along each such section. By selecting the appropriate gaseous substance, workpieces such as the container 18 in FIG. 1 can be subjected to treatments including cleaning, etching, conversion coating, surface coating or painting, electrostatic coating applications, electrocoating or painting, heat treating, baking, drying, cooling, quenching, lubricating, etc.

Figure 8:
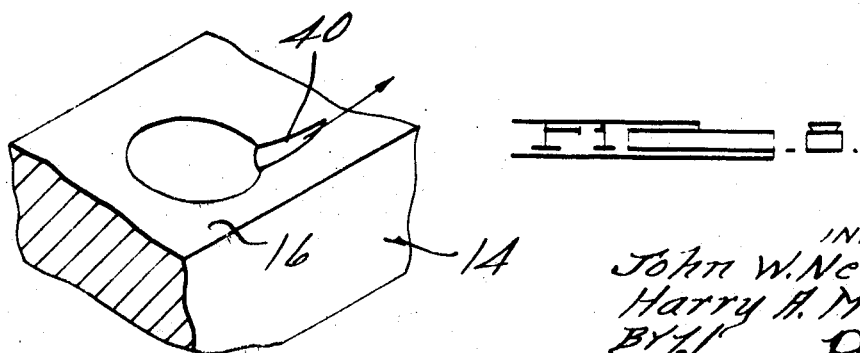
FIG 8 is a fragmentary perspective view of a vortex diffuser provided with a recess along a portion of the edge thereof for imparting an increased directional component to objects movably supported adjacent to the vortex discharged therefrom.

In addition to the provision of auxiliary nozzles 30, 32 as shown in FIGS. 1 and 2, respectively, the vortex diffuser 12 can be modified such that the edge thereof, at its juncture with the surface 16, is rounded or recessed as at 40, as shown in FIG. 8, which tends to create an unbalance in the forces acting on a supported article, tending to propel the article in a linear direction along the rail support. A selected disposition of the jets in a non-uniform manner relative to each vortex diffuser cavity alone or in further combination with the provision of suitable auxiliary jets can provide, in addition to a levitation of the object, an appropriate acceleration, deceleration, left-hand or right-hand rotation, linear and/or rotative oscillation, stopping, starting and linear movement as may be required or desired to achieve appropriate conveyance and/or treatment of such objects.

In addition to the substantially circular cylindrical configuration of the vortex diffuser 12 as shown in FIGS. 1–3 of the drawings, alternative satisfactory configurations can be employed in order to attain desired variations in the configuration of the fluid vortex produced and the pressure pattern thereof. As noted in FIG. 9, a vortex diffuser 42 is shown having a substantially square transverse cross sectional configuration. A vortex diffuser 44 is illustrated in FIG. 10 which is of a substantially equilateral triangular transverse cross sectional configuration. Pressurized fluid is supplied to the vortex diffusers 42, 44 by means of jets 46 such that the fluid rotates in a circular direction as illustrated by the arrows in FIGS. 9 and 10, forming a vortex. It will be appreciated that although the vortex diffusers of FIGS. 9 and 10 are of a configuration other than circular, the fluid has a tendency to form static portions in the corners of such irregularly-shaped cavities whereby a central substantially circular operative section is created. Due to the turbulence of the fluid in such irregularly-shaped vortex diffusers 42, 44, some reduction in efficiency is usually encountered and for this reason vortex diffusers of a substantially circular transverse cross sectional configuration are generally preferred.

It is also contemplated that a vortex diffuser 48 of a generally scroll-shaped configuration, as shown in FIG. 11, can be employed to advantage in some instances for providing a highly efficient configuration for producing a vortex. In the vortex diffuser 48, a jet 50 is disposed with its axis substantially tangential to the periphery of the cavity defining the vortex diffuser, minimizing turbulence.

Alternative satisfactory longitudinal cross sectional configurations of vortex diffusers are illustrated in FIGS. 12–23. The vortex diffusers as illustrated in these figures are of a substantially circular transverse cross sectional configuration and vary in diameter and/or contour on moving outwardly from an inlet jet 52 toward the face surface 54 thereof, whereby a desired variation in the vortex discharged therefrom is attained. In FIG. 12, a vortex diffuser 56 is shown which is of substantially equal diameter along the length thereof and is formed with a flat bottom wall 58. The pressurized fluid is adapted to be discharged in a substantially tangential direction into the vortex diffuser 56 through the jet 52 in a direction substantially parallel to the plane of the bottom wall 58. The arrangement shown in FIG. 12, while somewhat similar to the vortex diffuser 12 shown in FIGS. 1–3, is illustrative of still a further embodiment of the present invention in which a port or aperture 60 is formed in the base of the vortex diffuser 56 for supplying the same or an alternative fluid to or withdrawing fluid from the interior of the cavity to provide a desired variation in the flow and pressure pattern of the vortex discharged therefrom. The port or aperture 60 is connected to a suitable source of pressurized fluid (not shown) for supplying the supplemental fluid thereto. Such supplemental fluid may include, for example, a combustible gas which, upon admixture with air supplied to the jet 52, is adapted to burn adjacent to the face surface 54 for heating an object movably supported adjacent thereto. Alternatively, the port 60 can be connected to a suitable source of a reduced pressure for extracting a controlled amount of fluid from the vortex diffuser cavity on a continuous or intermittent basis as may be desired to achieve a preselected effect.

A vortex diffuser 62 is illustrated in FIG. 13, which is of a conical converging configuration; whereas a vortex diffuser 64 is shown in FIG. 14 of a conical outwardly diverging configuration. A vortex diffuser 66 is shown in FIG. 15 which is of a substantially cylindrical configuration and is provided with an annular shoulder 68 of a reduced diameter adjacent to the face surface 54. A vortex diffuser 70 is illustrated in FIG. 16 comprised of a substantially cylindrical lower section 72 and a conical converging outer section 74.

FIG. 17 illustrates a vortex diffuser 76 having an annular shoulder 78 of reduced diameter which is formed with a chamfered edge, indicated at 80, at its inner end. A vortex diffuser 82 is shown in FIG. 18 which is of a converging square stepped configuration on moving from the inside thereof outwardly toward the face surface 54. A divergent vortex diffuser 84 is shown in FIG. 19 in which the side walls thereof are of a parabolic curvature.

A vortex diffuser 86 is shown in FIG. 20 which is of a substantially circular cylindrical configuration and incorporates a substantially concentric central cylindrical core 88 forming an annular cavity. A vortex diffuser 90, as illustrated in FIG. 21, is similar to that shown in FIG. 20 but the central core 92 is of a truncated conical configuration. It will be noted in FIGS. 20 and 22 that the end portions of central cores 88, 92 terminate at a point disposed in the plane of the face surface 54.

A vortex diffuser 94 is illustrated in FIG. 22 which is formed with outwardly divergent arcuate walls and a conical central core 96 terminating at a point lying in the plane of the face surface 54. A vortex diffuser 98 is shown in FIG. 23 which is formed with a substantially circular cylindrical outer wall and an arcuate central core 100 disposed concentrically thereof which terminates at a point spaced inwardly of the plane of the face surface 54.

It will be appreciated that still other alternative configurations of vortex diffusers from those shown in FIGS. 9 through 23 can be employed in order to provide the desired operating characteristics consistent with the intended end use of the system.

Figure 24:
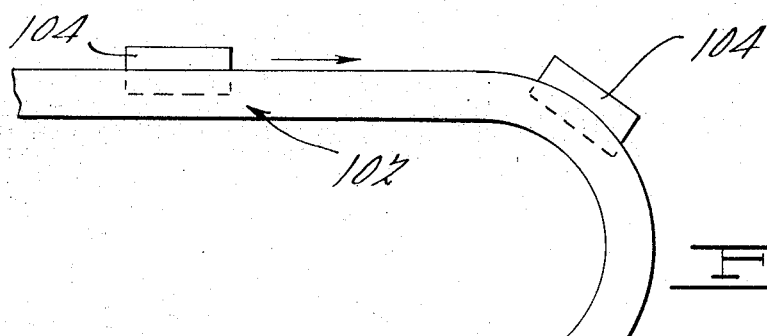
FIG. 24 is a fragmentary side elevational view of an air rail incorporating an arcuate section disposed in a vertical plane.
Figure 25:
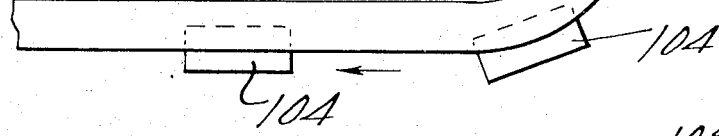
FIG. 25 is a fragmentary plan view of an air rail incorporating an arcuate offset section disposed in a horizontal plane.

In addition to substantially straight sections of the air rail as shown in FIGS. 1–3, it is also contemplated that the air rail can be formed in arcuate configurations disposed in vertical and horizontal planes. An air rail 102 is fragmentarily shown in FIG. 24, along which a plurality of containers 104 are movably supported and are advanced in a generally clockwise direction, as viewed in FIG. 24, around an arcuate end section which is disposed in a substantially vertical plane. In order to retain the containers 104 on the arcuate end section, it is usually desired to position the vortex diffusers at closer increments to assure that at least one such vortex diffuser will at all times be in operative contact with the surface of such container. In a similar manner, a rail 106 is shown in FIG. 25 which incorporates an arcuate S-shaped offset section therein, along which the containers 108 are movably transported.

Figure 26:
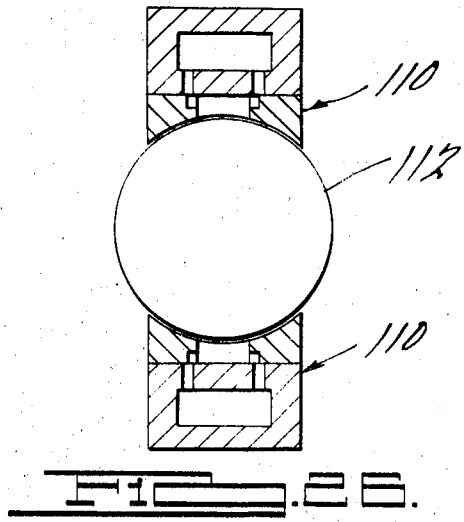
FIG. 26 is a transverse vertical sectional view similar to FIG. 2 but wherein two air rails are employed which are disposed in diametricaly opposed relationship.
Figure 27:
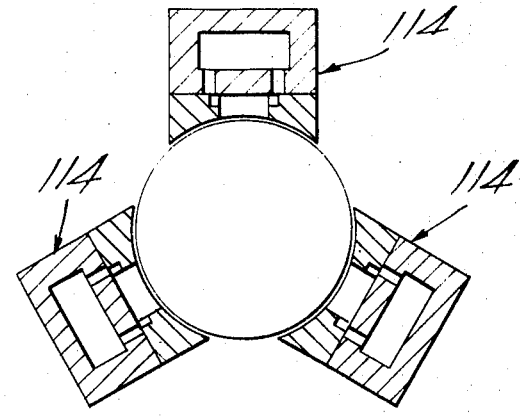
FIG. 27 is a transverse vertical sectional view similar to FIG. 26 but wherein three air rails are employed which are disposed at substantially equal angular increments for supporting a cylindrical object therebetween.

In the various fluid rail arrangements previously described, a single rail is employed for forming the cushion of fluid on which the articles are movably supported. It is also contemplated within the scope of the present invention that two or more fluid rail assemblies can be employed for providing a clamping effect upon articles movably supported therebetween. FIG. 26 illustrates the use of two fluid rail assemblies 110 which are disposed in diametrically opposed relationship for supporting an article such as a cylindrical container 112 therebetween. Similarly, FIG. 27 illustrates the use of three fluid rail assemblies 114 which are disposed at substantially equal arcuate increments for movably supporting an article such as the substantially cylindrical container 116 therebetween.

In addition to providing for conveyance of objects and/or a treatment thereof, the vortex diffuser of the present invention can also be employed as a linear motor, such as illustrated in FIGS. 28–30. As shown, the device comprises a pair of substantially flat opposed platens 118, each formed with four vortex diffusers 120 to which a pressurized fluid, such as air, is supplied from plenums 122. The face surfaces of the platens 118 are spaced apart a distance sufficient to accommodate a strip or sheet 124 which is supported substantially centrally therebetween by a fluid cushion on each face surface thereof. A propelling force in a unilateral direction is applied to the strip 124 by orienting jets 126 of the vortex diffusers 120 such that a net propulsive force is exerted by each such vortex diffuser in the direction of the arrows as shown in FIG. 29. Accordingly, the strip 124 is adapted to be continuously advanced in a direction from left to right, as viewed in FIG. 28, while supported on a substantially frictionless fluid cushion.

The strip 124 of the linear motor shown in FIG. 28 may be of a closed loop configuration with the ends thereof trained around suitable shafts or pulleys for converting the linear movement thereof to a rotary movement as may be desired. In addition, the device shown in FIGS. 28–31 can also be employed as a tensioning device for applying and/or maintaining a preselected tension on a strip or sheet which can be varied by controlling the pressure of fluid discharged from the vortex diffusers.

An alternative arrangement for supplying an appropriate volume of pressurized fluid to the vortex diffusers of a rail is illustrated in FIGS. 31 and 32. In the specific embodiment illustrated, an aspirator effect is employed which is driven by a low volume high pressure supply of fluid which is operative to entrain substantially larger volumes of low pressure fluid which, in combination, are discharged from angular jets 128 into vortex diffusers 130 of a rail 132. The supply of the high pressure fluid, such as air, enters a manifold 134 through a supply pipe 136 and is discharged through aligned ports 138 into the angular jets 128. The aspirating effect formed by the high-velocity discharge of pressurized air into the jets 128 causes air in the surrounding atmosphere, as shown in FIG. 32, to be drawn into the outer end of the jets 128, the opening of which is controlled by a metering plate 140.

An arrangement is illustrated in FIG. 33 whereby an article 142, such as a container, while movably supported on an air rail section 144, can be heated by a helically wound induction coil 146 to provide a desired degree of heat treatment, drying, etc.

While it will be apparent that the invention herein dis-closed is well calculated to achieve the benefits and advantages hereinabove set forth, it will be appreciated that the invention is susceptible to modification, variation and change without departing from the spirit thereof.

What is claimed is:

1. A vortex diffuser fluid bearing device comprising a three-dimensional member having one surface formed with a cavity extending inwardly thereof, supply means disposed in communication with said cavity for supplying a fluid thereto in a manner to cause said fluid to travel in a helical direction about the axis of said cavity in the form of a vortex and outwardly beyond said one surface of said member, a body disposed in overlying spaced relationship and outside of the opening of said cavity and said one surface therearound and separated from said one surface on a cushion of said fluid, said fluid discharged from said cavity outwardly between said one surface and the adjacent surface of said body for simultaneously applying an attractive and a separating force to said body.

2. The fluid bearing device as defined in claim 1, wherein said cavity is of a generally circular transverse cross section.

3. The fluid bearing device as defined in claim 1, wherein said fluid enters said cavity in a generally tangential direction relative to the wall thereof.

4. The fluid bearing device as defined in claim 1, wherein said fluid is a gas.

5. The fluid bearing device as defined in claim 1, wherein said fluid is a liquid.

6. The fluid bearing device as defined in claim 1, wherein said fluid comprises an aerosol.

7. The fluid bearing device as defined in claim 1, wherein said fluid contains solid particles entrained therein.

8. The fluid bearing device as defined in claim 1, wherein said fluid comprises a treating fluid for performing a preselected treatment of said surface of said body coming in contact therewith.

9. The fluid bearing device as defined in claim 1, wherein said fluid is combustible.

10. The fluid bearing device as defined in claim 1, wherein said supply means comprises a plurality of jets disposed in circumferentially spaced increments for supplying said fluid to said cavity in a direction substantially tangential relative to the wall defining said cavity.

11. The fluid bearing device as defined in claim 1, wherein said one surface of said member is concave and corres-ponds to the contour of the surface of said body which is of a circular cylindrical configuration.

12. The fluid bearing device as defined in claim 1, further including auxiliary supply means disposed in communication with said cavity for introducing a supplemental fluid into said vortex.

13. The fluid bearing device as defined in claim 1, further including an auxiliary jet disposed in communication with said cavity for withdrawing a controlled portion of said fluid therefrom.

14. The fluid bearing device as defined in claim 1, wherein a pair of said members are employed with said one surface of each said member disposed in spaced substantially parallel opposed relationship for movably and drivingly supporting said body therebetween, said body having an elongated configuration of indefinite length and drivingly coupled to a driven member.

15. A method for supporting a body on a cushion of fluid which comprises the steps of providing a supporting surface formed with at least one cavity therein, discharging a pressurized fluid into said cavity in a manner to cause said fluid to travel in a helical direction outwardly of said cavity in the form of a vortex characterized as having a lower pressure in the central portion thereof in comparison to the pressure at the periphery thereof as measured across the outlet of said cavity and for discharge beyond said supporting surface, positioning a body adjacent to said supporting surface and outwardly of and in overlying relationship relative to said cavity, causing the fluid to travel across the surface of said body disposed adjacent to said supporting surface in a manner to apply an attractive force and a separating force thereto and maintaining the body separated from said supporting surface by a cushion of said fluid.

16. The method as described in claim 15, wherein said fluid comprises a treating fluid and performs a predetermined treatment upon coming in contact with the surface of said body.

* * * * *